United States Patent [19]

Enomoto et al.

[11] 3,789,863
[45] Feb. 5, 1974

[54] FLUID PRESSURE GOVERNOR VALVE

[75] Inventors: Koji Enomoto; Kunio Ohtsuka; Wataru Ishimaru, all of Yokohama City, Japan

[73] Assignee: Nissan Motor Company, Limited, Yokohama City, Japan

[22] Filed: Dec. 7, 1971

[21] Appl. No.: 205,520

[30] Foreign Application Priority Data
July 14, 1971  Japan.............................. 46/61181

[52] U.S. Cl..................................... 137/54, 74/752
[51] Int. Cl. ............................................ G05d 13/10
[58] Field of Search ........... 137/54, 56; 74/431, 432

[56] References Cited
UNITED STATES PATENTS

| | | | |
|---|---|---|---|
| 3,584,634 | 6/1971 | Jagdmann............................. | 137/54 |
| 3,542,046 | 11/1970 | Moan..................................... | 137/54 |
| 3,630,215 | 12/1971 | Okimoto................................ | 137/54 |
| 3,048,184 | 8/1962 | Duffy.................................. | 137/54 X |
| 3,450,144 | 6/1969 | Horsch.................................. | 137/54 |
| 3,552,409 | 1/1971 | Michnay et al....................... | 137/54 |
| 3,568,696 | 3/1971 | Kubo ..................................... | 137/54 |
| 3,642,014 | 2/1972 | Searles................................. | 137/54 |

FOREIGN PATENTS OR APPLICATIONS

| | | | |
|---|---|---|---|
| 1,902,315 | 9/1969 | Germany .............................. | 137/56 |

Primary Examiner—Manuel A. Antonakas
Assistant Examiner—Allan Russell Burke
Attorney, Agent, or Firm—Robert S. Auten

[57] ABSTRACT

A fluid pressure governor valve adapted to produce a pressure signal that is proportional in magnitude to the speed of rotation of an output shaft of an automotive power transmission having a parking lock gear mounted for rotation with the output shaft, which governor valve consists of a valve body formed by a convex portion of the parking lock gear, first and second valve chambers formed in the convex portion of the parking lock gear, first and second passages formed in a disc portion of the parking lock gear and respectively communicating with the first and second valve chambers, and first and second drain ports formed in the convex portion of the parking lock gear and respectively communicating with the first and second valve chambers. The governor valve further consists of a primary governor valve element and a secondary governor valve element, which are radially movably accommodated in the first and second valve chambers, respectively. The primary and secondary governor valve elements are associated with each other for thereby producing a pressure signal that is proportional in magnitude to the speed of rotation of the output shaft.

1 Claim, 3 Drawing Figures

PATENTED FEB 5 1974

3,789,863

INVENTORS
KOJI ENOMOTO, KUNIO OHTSUKA + WATARU ISHIMARU
BY John Lezelly
ATTORNEY

FLUID PRESSURE GOVERNOR VALVE

This invention relates to fluid pressure governor valves and, more particularly, a fluid pressure governor valve for establish a pressure signal that is proportional in magnitude to the speed of rotation of an output of an automotive multiple speed ratio power transmission.

An object of this invention is to provide a new and unique fluid pressure governor valve which is simplified in construction and light in weight.

Another object of this invention is to provide a fluid pressure governor valve permitting the use of a minimum number of component parts thereby reducing excessive space to be required for installation.

Still another object of this invention is to provide a fluid pressure governor valve employing a minimum number of component parts thereby reducing the production cost of the fluid pressure governor valve and, at the same time, minimizing the maintenance problems.

A further object of this invention is to provide a fluid pressure governor valve which provides ease and simplicity of assembling of the governor valve.

In order to achieve these and other objects and advantages, the present invention contemplates to provide a unique construction of a fluid pressure governor valve having a valve body which is formed integral with a parking lock gear mounted for rotation with an output shaft of an automotive power transmission. The valve body, which is formed integral with the parking lock gear, has formed therein first and second valve chambers. The first and second valve chambers are provided with first and second drain ports, respectively. First and second passages are formed in the parking lock gear and communicates with the first and second valve chambers, respectively. The first and second passages communicate with each other. A primary governor valve element is radially movably accommodated in the first valve chamber for controlling fluid communication between the first passage and the first drain port thereby to vary the pressure to be delivered to the second passage. A secondary governor valve element is radially movably accommodated in the second valve chamber and responsive to the pressure in the second passage thereby to establish in the second passage a pressure signal that is proportional in magnitude to the speed of rotation of the output shaft.

These and other object and advantages of the present invention will be more clearly described in connection with the accompanying drawings in which.

Figure 1:
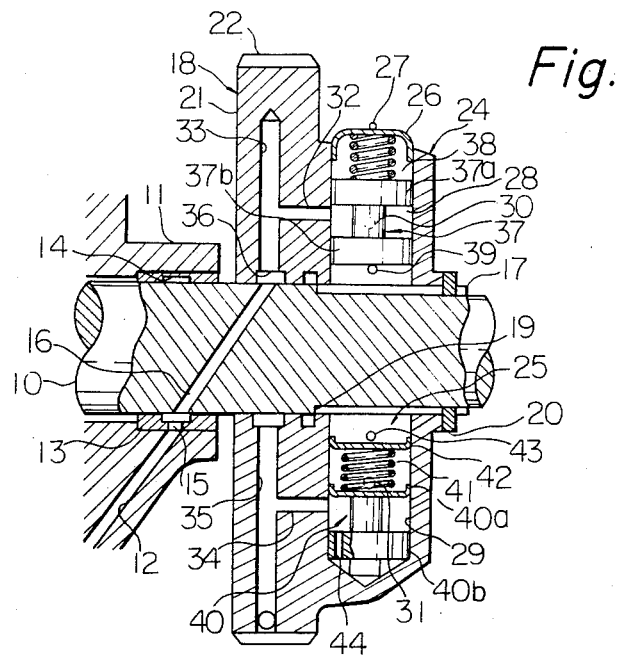
FIG. 1 is a sectional view of a fluid pressure governor valve implementing the present invention.

Referring now to FIG. 1, the output shaft of an automotive multiple speed ratio power transmission is generally indicated by reference numeral 10. The output shaft 10 is rotatably supported by a bearing 11, which may be formed as a part of the transmission housing, not shown. As seen from FIG. 1, the bearing 11 is formed with a fluid pressure supply passage 12 which may be connected to a hydraulic control system (not shown) of the power transmission. A stationary bushing 13 is disposed between the output shaft 10 and the inner wall of the bearing 11. The bushing 13 is formed with an annular groove 14 on its inner periphery, which groove 14 cummunicates with the fluid pressure supply passage 12 through an aperture 15 formed in the bushing 13.

A passage 16 is formed in the output shaft 10 and is in communication with the fluid pressure supply passage 12 through the aperture 15 to distributed fluid pressure in the passage 12 to the valve assemblies for the fluid pressure governor valve which will be described hereinafter.

As shown in FIG. 1, the output shaft 10 is formed with a spline 17, to which a parking lock gear 18 is splined. The parking lock gear 18 is held against a shoulder 19 formed on the output shaft 10 by means of a snap ring 20 carried by the output shaft 10.

Figure 2:
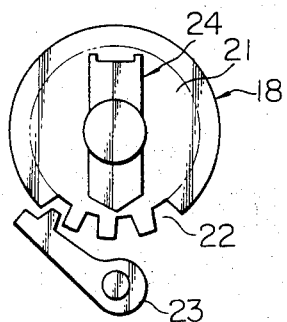
FIG. 2 is a schematic side view of the fluid pressure governor valve shown in FIG. 1.

The parking lock gear 18 consists of a disc portion 21 having teeth 22 on its periphery. As seen from FIG. 2, the peripheral teeth 22 is adapted to engage with a parking pawl 23 that is under the control of the vehicle operator. The parking pawl 23 in turn is anchored to the transmission housing, through not shown. As shown in FIG. 1, the parking lock gear 18 also consists of a radially extending convex portion 24 which is integral with the disc portion 21.

It is an important feature of the present invention that a governor valve body forming a part of the fluid pressure governor valve is formed by the radially extending convex portion 24 of the parking lock gear 18. This unique structure may be made from a one-piece die casting, if desired.

The radially extending convex portion 24 is formed with a radially extending common valve bore 25, of which radially outward end is closed by means of a cap member 26. It will be understood that the valve bore 25 may be drilled by a drill in a simplified manner resulting in a low cost process. The cap member 26 is restrained from moving radially outwardly of the drawing by means of a stop pin 27 mounted on the governor valve body 24. The common bore 25 includes a first valve chamber 28 and a second valve chamber 29 which are formed in the convex portion 24 of the parking lock gear 18. The first and second valve chambers 28 and 29 are formed with first and second drain ports 30 and 31, through which an excess of fluid pressure is drained off to regulate the fluid pressure in a manner to be discussed hereinafter.

The first valve chamber 28 communicates with a port 32, which in turn communicates with a first passage 33. Likewise, the second valve chamber 29 communicates with a port 34, to which a second passage 35 also communicates. As seen from FIG. 1, the first and second passages 33 and 35 are formed in the disc portion 21 of the parking lock gear 18. The disc portion 21 is formed with an annular groove 36 which is in communication with the passage 16 formed in the output shaft 10. The first and second passages communicate with each other. It will be appreciated that the first and second passages are made integral with each other by drilling one common bore which radially extends.

A primary governor valve element 37, which is constructed as a spool valve, is radially movably accommodated in the first valve chamber 28. The primary governor valve element 37 has spaced inner and outer valve lands 37a and 37b, respectively. The inner land 37b controls fluid communication between the first passage 33 and the first drain port 30. A first compression spring 38 is disposed in the first valve chamber and seated on the cap member 26 for biasing the primary governor valve element 37 radially inwardly. The radially inward movement at the primary governor valve element 37 is limited by a stop pin 39 projecting in the first valve chamber 28.

In the similar fashion, a secondary governor valve element 40, which is constructed as a spool valve, is radially movably accommodated in the second valve chamber 29. The secondary governor valve element 40 has spaced inner and outer valve lands 40a and 40b, respectively. The inner valve land 40a is so arranged as to control fluid communication between the second passage 35 and the second drain port 31. A second compression spring 41 is disposed in the second valve chamber 29 for biasing the secondary governor valve element 40 radially outwardly.

The second compression spring 41 is seated on a spring seal 42, of which radially inward movement is restrained by a stop pin 43 projecting in the second valve chamber 29. The outer valve land 40b is formed with an aperture 44 which permits the pressure prevailing in the second valve chamber 29 between the inner and outer valve lands 40a and 40b to act on the outside of the outer valve land 40b for thereby biasing the secondary governor valve element radially inwardly against the force of the spring 41.

When, now, the output shaft 10 starts to rotate with a fluid pressure obtaining in the fluid pressure supply passage 12, a centrifugal force is exerted on the mass of the convex portion 24 of the parking lock gear 18 serving as the governor valve body 24. If, in this instance, the output shaft 10 is rotating at low speed, the centrifugal force to be exerted on the primary governor valve element 37 is low in magnitude so that the valve element 37 assumes a position shown in FIG. 1 by the action of the first compression spring 38. Fluid communication then is established between the first passage 33 and the first drain port 30. When, this occurs, the fluid pressure in the fluid pressure supply passage 12 is passed through the passage 16, the first passage 33 and the port 32 to the first chamber 28, from which the fluid pressure is drained off through the first drain port 30. Thus, the pressure that is made available to the first passage 33 is equal to zero.

Figure 3:
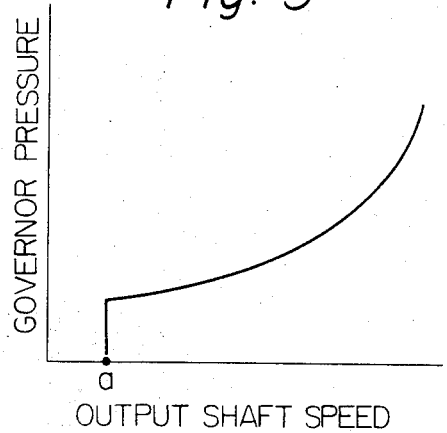
FIG. 3 is a graphical representation of the pressure regulating characteristics of the fluid pressure governor valve shown in FIGS. 1 and 2.

If the rotation speed of the output shaft 10 increases to a certain elevated point a (see FIG. 3), then the centrifugal force acting upon the primary governor valve element 37 due to its mass will move the valve element 37 radially outwardly against the opposing force of the first compression spring 38 thereby interrupting fluid communication between the drain port 30 and the first passage 33. Accordingly, the fluid pressure in the fluid pressure supply passage 12 is distributed through the passage 16 to the second passage 35, from which the fluid pressure is delivered into the second valve chamber 29 through the port 34. The fluid pressure delivered into the second valve chamber 29 is then allowed through the aperture 44 formed in the outer valve land 40b of the secondary governor valve element 40 into the second valve chamber 29 between the outer valve land 40b and the radially outer most wall of the valve chamber 29. When this takes place, the secondary governor valve element 37 is moved radially inwardly against the combined forces resulting from the centrifugal force and the force of the second compression spring 41. Under this circumstance, the secondary governor valve element 40 will become stationary when the inward force resulting from the fluid pressure exerted on the outer valve land 40b is balanced with the combined forces resulting from the centrifugal force and the spring action. Consequently, the pressure that is available to the second passage 35 increases with the increase in rotational speed of the output shaft, as shown in the graph of FIG. 3. Thus, upon the attainment of a predetermined rotational speed, the secondary governor valve element 40 will assume a modulating position and a pressure signal in the second passage 35 will be related in magnitude to the rotational speed. At any speed less than a desired design speed, however, the modulating action of the valve element will be inhibited and the pressure signal will zero.

Moreover, the parking pawl 23 is actuated, during parking condition, to engage with the peripheral teeth 22 of the parking lock gear 18 thereby preventing movement of the motor vehicle.

It will now be appreciated that the fluid pressure governor valve according to the present invention is advantageous in that, because the valve body is formed by a convex portion of the parking lock gear of the power transmission, it is not only easy to manufacture but also easy to assemble thereby reducing production cost of the governor valve.

We claim:

1. A combination with a parking lock gear mounted for rotation with an output shaft of an automotive automatic power transmission and having a disc portion provided with teeth on its outer periphery and having a radially extending convex portion which is integral with said disc portion, of a fluid governor valve for establishing a pressure signal that is proportional in magnitude to the speed of rotation of said output shaft of the sutomatic power transmission, said fluid pressure governor valve comprising first and second valve chambers formed in said convex portion of said parking lock gear, first and second passage formed in said disc portion of said parking lock gear and respectively communicating with said first and second valve chambers, said first and second passages communicating with each other, first and second drains formed in said convex portion of said parking lock gear and respectively communicating with said first and second valve chambers, a primary governor valve element radially movably accommodated in said first valve chamber and having spaced inner and outer valve lands formed thereon, the inward valve land of said primary governor valve element controlling fluid communication between said first passage and said first drain thereby to vary the pressure in said first passage, a first spring means disposed in said first valve chamber for biasing said primary governor valve element radially inwardly, a secondary governor valve element radially movably disposed in said second valve chamber and having spaced inner and outer valve lands formed thereon, the inner valve land of said secondary governor valve element controlling fluid communication between said second passage and said second drain thereby to establish in said second passage a pressure signal, the outer valve land of said second governor valve element having an aperture to cause the pressure in said second valve chamber to act on the outside of the outer valve land of said secondary governor valve element thereby to move the same radially inwardly, and a second spring means disposed in said second valve chamber for biasing said secondary governor valve element radially outwardly.

* * * * *